(12) United States Patent
Sixsou et al.

(10) Patent No.: US 8,656,221 B2
(45) Date of Patent: Feb. 18, 2014

(54) SYSTEM ON CHIP BREAKPOINT METHODOLOGY

(75) Inventors: Emmanuel Sixsou, Jerusalem (IL);
Elchanan Rushinek, Neve Yaraq (IL);
Mois Navon, Efrat (IL)

(73) Assignee: Mobileye Technologies Limited, Nicosia (CY)

( * ) Notice: Subject to any disclaimer, the term of this patent is extended or adjusted under 35 U.S.C. 154(b) by 400 days.

(21) Appl. No.: 12/779,422

(22) Filed: May 13, 2010

(65) Prior Publication Data

US 2011/0219217 A1 Sep. 8, 2011

(30) Foreign Application Priority Data

Mar. 8, 2010 (EP) .................................... 10155793

(51) Int. Cl.
*G06F 11/00* (2006.01)

(52) U.S. Cl.
USPC .................... 714/34; 714/10; 714/48; 714/37

(58) Field of Classification Search
USPC .................... 714/34, 25, 10, 48, 35
See application file for complete search history.

(56) References Cited

U.S. PATENT DOCUMENTS

| | | | |
|---|---|---|---|
| 5,355,468 A | 10/1994 | Jeppesen, III | |
| 6,134,676 A | 10/2000 | VanHuben et al. | |
| 6,598,178 B1 | 7/2003 | Yee et al. | |
| 6,857,084 B1 | 2/2005 | Giles | |
| 7,080,283 B1 | 7/2006 | Songer et al. | |
| 7,219,265 B2 | 5/2007 | Yee | |
| 7,367,016 B2 * | 4/2008 | Meyer et al. | 717/114 |
| 7,444,549 B1 | 10/2008 | Chang | |
| 7,644,310 B2 | 1/2010 | Kang et al. | |
| 2002/0138801 A1 | 9/2002 | Wang et al. | |
| 2004/0030870 A1 * | 2/2004 | Buser | 712/227 |
| 2009/0265582 A1 * | 10/2009 | Udupa et al. | 714/37 |
| 2010/0332909 A1 * | 12/2010 | Larson | 714/40 |

OTHER PUBLICATIONS

European Patent Office Search Report, app No. EP10155793.2, May 10, 2010.
European Patent Office Examination Report, EP10155793.2, Jun. 7, 2011.

(Continued)

*Primary Examiner* — Sarai Butler
(74) *Attorney, Agent, or Firm* — The Law Office of Michael E. Kondoudis

(57) ABSTRACT

A system-on-chip (SoC) with a debugging methodology. The system-on-chip (SoC) includes a central processing unit (CPU) and multiple computing elements connected to the CPU. The CPU is configured to program the computing elements with task descriptors and the computing elements are configured to receive the task descriptors and to perform a computation based on the task descriptors. The task descriptors include a field which specifies a breakpoint state of the computing element. A system level event status register (ESR) attaches to and is accessible by the CPU and the computing elements. Each of the computing elements has a comparator configured to compare the present state of the computing element to the breakpoint state. The computing element is configured to drive a breakpoint event to the event status register (ESR) if the present state of the computing element is the breakpoint state. Each of the computing elements has a halt logic unit operatively attached thereto, wherein the halt logic unit is configured to halt operation of the computing element. The ESR is configurable to drive a breakpoint event to the halt logic units to halt at least one of the computing elements other than the computing element driving the breakpoint event.

16 Claims, 6 Drawing Sheets

(56) References Cited

OTHER PUBLICATIONS

Witness Statement, In the Matter of European Patent Application No. 10155793.2 Mobileye Technologies Ltd, by Edmond Chalom, Oct. 6, 2011.

Andreas Wieferink et al. A Generic Toolset for SoC Multiprocessor Debugging and Synchronisation. In IEEE International Conference on Application-Specific Systems, Architectures and Processors (ASAP), The Hague (Netherlands), Jun. 2003.

* cited by examiner

SYSTEM ON CHIP BREAKPOINT METHODOLOGY

CROSS-REFERENCE TO RELATED APPLICATION

The application claims the benefit of priority from European Patent Application No. EP10155793, filed Mar. 8, 2010.

FIELD AND BACKGROUND

1. Field

The present invention relates to a signal processing system on chip (SoC) including a central processing unit (CPU) and multiple computing elements, and in particular, the present invention relates to a methodology for implementing breakpoints and debugging during the processing of the CPU and the multiple computing elements.

2. Related Art

Since the 1990's, integrated circuit (IC) design has evolved from a chip-set philosophy to an embedded core based system-on-chip (SoC) concept. An SoC integrated circuit includes various functional blocks, such as microprocessors, interfaces, memory arrays, and digital signal processors (DSP). The resulting SoCs have become quite complex. Moreover, the techniques used in the design of these SoCs have not scaled with the complexities of chip designs. In addition to prior testing of the component functional blocks, the interfaces between the blocks are functionally verified by various well-known techniques. Preventive steps include writing many vectors to check the functionality of a device and running code coverage tools to evaluate the test results. Scan chain testing is well-known in the prior art and permits determining the internal states of various memories and registers contained in the functional block. Frequently, problems in the resulting SoC are encountered in spite of these levels of testing. Moreover, if there are problems in a design after the device has been fabricated, it may be extremely difficult to determine the cause of the problems. This difficulty can be attributed to the number of functional blocks that are potential sources of the problem and the lack of visibility of the internal operation of the SoC device. Additionally, the operation of the device can differ significantly from the simple functional vectors that are typically used to verify the interfaces of the functional blocks.

In spite of such efforts, functional problems do occur in fabricated devices. The likelihood of functional problems occurring increases with the complexity of the SoC. For such complex systems, it is virtually impossible to write vectors to test all the different combinations of functional operation of functional blocks. Moreover, there may be functional features that the designer did not think about testing. Further, the functional problem may occur after extended periods of operation and accordingly cannot be easily detected by running simple test vectors.

When functional problems do occur with fabricated SoCs, designers attempt to determine the cause by observing the state of internal registers, internal memories, or by monitoring the outputs of the pins to the device (e.g. by various prior art means such as test probing of the device pins as well as more sophisticated methods employing computer driven debugging interfaces). Often, there is insufficient visibility to the internal state of the SoC device. In such cases, the designer must speculate as to what the cause of the functional failure is. As a result, it may take several revisions to the circuit design before the problem is corrected.

There is thus a need for, and it would be highly advantageous to have, a methodology for debugging a system-on-chip including multiple functional blocks, e.g. CPU and multiple computing elements.

Reference is now made to FIG. 1 which illustrates a conventional system on chip (SoC) 10 including a CPU 101 and multiple computing elements 109 connected by a crossbar matrix 111. System 10 includes shared memory 103 and a shared direct memory access (DMA) unit 105 for accessing memory 103. Alternatively, conventional system 10 may be configured with a bus and bus arbiter instead of crossbar matrix 111. When CPU 101 runs a task on one of computing elements 109, CPU 101 transfers to computing element 109 a task descriptor including various parameters: a desired operation (opcode) and operands specifying the task and then instructs computing element 109 to start processing the task. The specific opcode is preferably supplied within a command word which also includes various control bits. CPU 101 then monitors the completion status of each computing element 109 in order to obtain the respective results and prepares further tasks, on a task by task basis, for each computing element 109.

BRIEF SUMMARY

According to an aspect of the present invention, there is provided a system-on-chip (SoC) with a debugging capability. The system-on-chip (SoC) includes a central processing unit (CPU) and multiple computing elements connected to the CPU. The CPU is configured to program the computing elements with task descriptors and the computing elements are configured to receive the task descriptors and to perform a computation based on the task descriptors. The task descriptors include a field which specifies a breakpoint state of the computing element. A system level event status register (ESR) attaches to and is accessible by the CPU and the computing elements. Each of the computing elements has a comparator configured to compare the present state of the computing element to the breakpoint state. The computing element is configured to drive a breakpoint event to the event status register (ESR) if and/or when the present state of the computing element is the breakpoint state. Each of the computing elements has a halt logic unit operatively attached thereto, wherein the halt logic unit is configured to halt operation of the computing element. The ESR is configurable to drive a breakpoint event to the halt logic units. One or more of the computing elements may be halted other than the computing element driving the breakpoint event. A debug control register (DCR) may be attached to and accessible by the CPU and the computing elements. The DCR provides control inputs to the halt logic units. The control inputs of the DCR may be configurable so that when a single computing element drives the breakpoint event, based on the control inputs from the DCR, all the computing elements are halted except the single computing element, only the single computing element is halted, all the computing elements are halted, or only some but not all of the computing elements are halted.

According to an aspect of the present invention, there is provided a method for debugging a system on a chip (SoC). The SoC includes a central processing unit (CPU), multiple computing elements connected to the CPU. The computing elements are programmed by the CPU with task descriptors. The task descriptors are received by the computing elements. Based on the task descriptors, a computation is performed (by the computing elements) The task descriptors include a field which specifies a breakpoint state of the computing element.

The present state of the computing element is compared to the breakpoint state. Upon the present state of the computing element being the breakpoint state, a breakpoint event is driven to the event status register (ESR). Operation of a computing element may be halted other than the computing element driving the breakpoint event.

A debug control register (DCR) attached to and accessible by the CPU and the computing elements is configured, and the halting is performed based on the configuration of the DCR. Halting for any of the computing elements may be performed either at the end of one of the computations or during one of the computations. Upon halting one or more computing elements, the CPU may debug one or more of the computing elements. A system level event status register (ESR) is attached to and accessible by the CPU and the computing elements. The ESR may be accessed to determine which of the computing elements triggered the break event and which computing elements are halted as a result of the break event. The halt operation may be controlled based on control inputs (from the DCR). When the breakpoint event is driven from a single computing element, based on the control inputs, all the computing elements except the single computing element are halted, all the computing elements are halted or some but not all of the computing elements are halted.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein.

DETAILED DESCRIPTION

Figure 1:
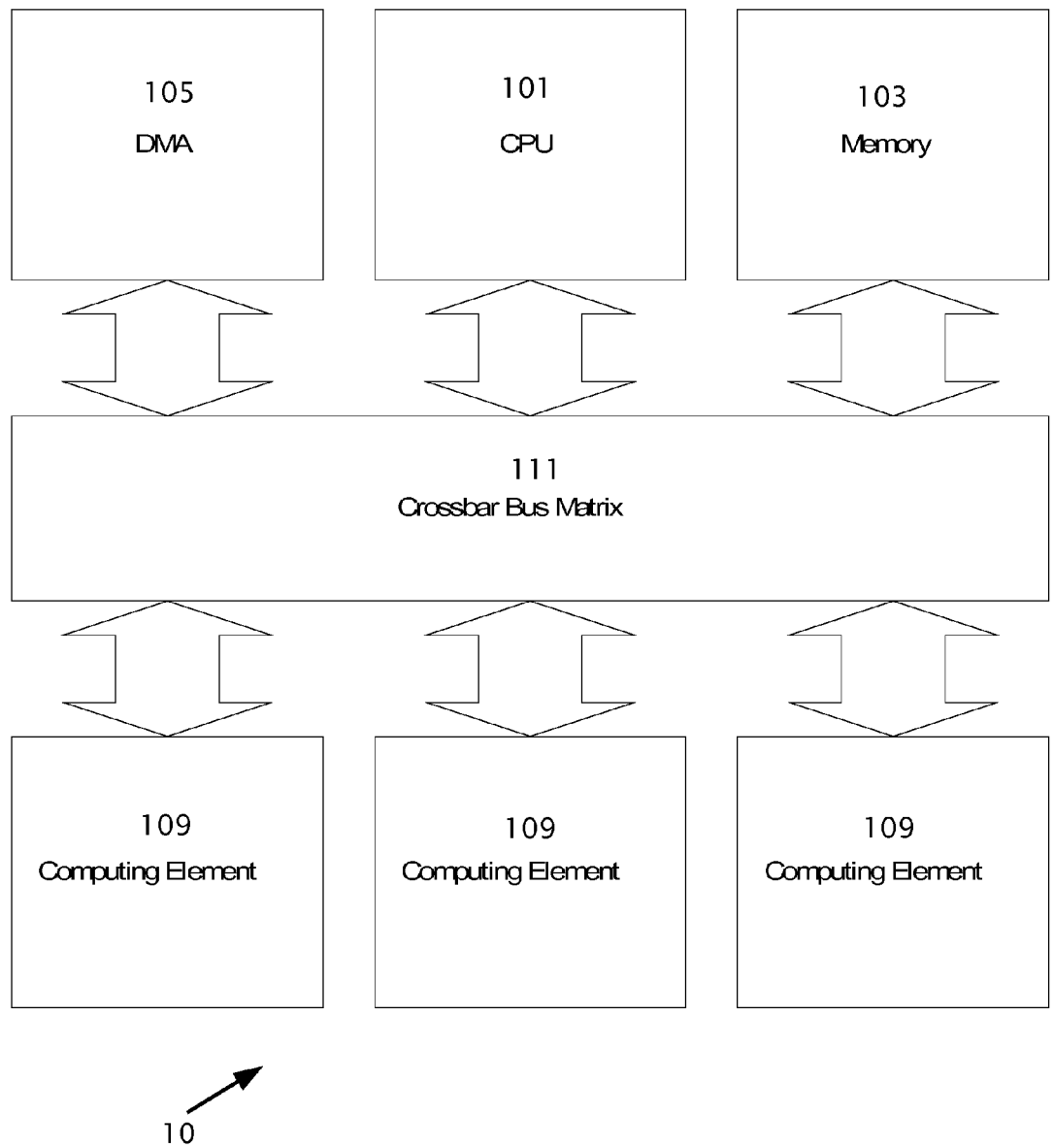
FIG. 1 illustrates a conventional system on chip (SoC) of the prior art, the system including a CPU and multiple computing elements.

Reference will now be made in detail to embodiments of the present invention, examples of which are illustrated in the accompanying drawings, wherein like reference numerals refer to the like elements throughout. The embodiments are described below to explain the present invention by referring to the figures.

It should be noted, that although the discussion herein relates primarily to a vision processing system for parallel processing using a system on chip (SoC) in a driver assistance application, the present invention may, by non-limiting example, alternatively be configured for other types of systems on chips and parallel processing.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 2A:
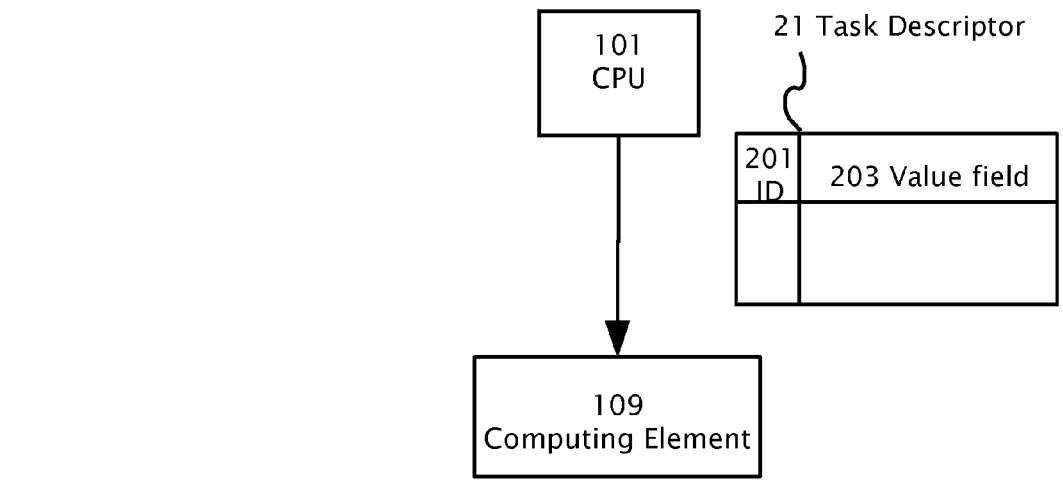
FIG. 2A illustrates a simplified block diagram of the CPU passing instruction parameters in a task descriptor to a computing element, according to a feature of the present invention.

Referring now to the drawings, FIG. 2A shows a simplified block diagram of CPU 101 passing instruction parameters in a task descriptor to a computing element 109. The instruction parameters include for example a debug/ID control bit 201 and a value field 203 for instance of 15 bits. The number of bits is typically dictated by the number of breakpoint states such that the number of bits can accommodate all the possible states in a binary e.g. base 2 representation. (For example, 8 breakpoint states in a CE require a 3 bit "value" field)

Figure 2B:
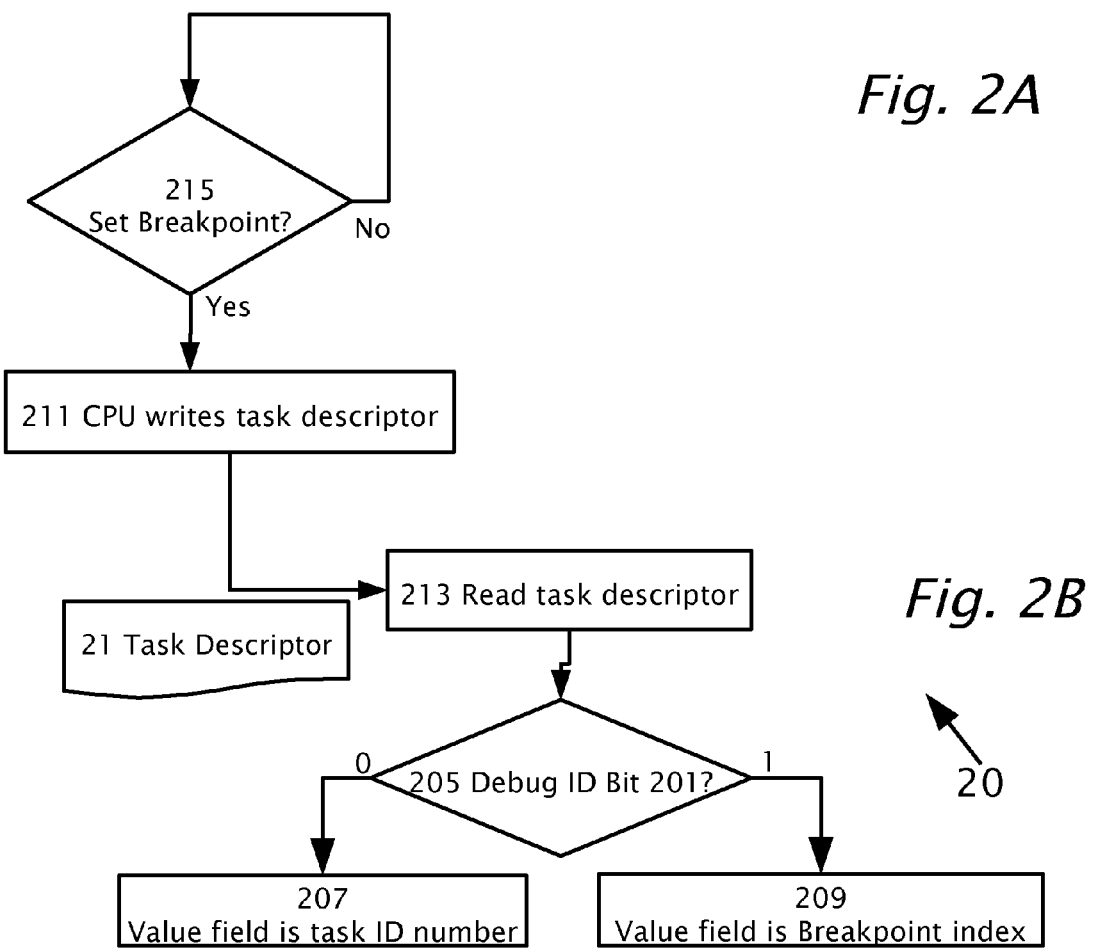
FIG. 2B is a simplified flow diagram of a method, according to a feature of the present invention.

Reference is now also made to FIG. 2B, a simplified flow diagram of a method 20, according to a feature of the present invention. The decision to set up a breakpoint or not is typically made by CPU 101. If a decision is made in decision box 215 to set up a breakpoint, CPU 101 then writes (step 211) a task descriptor 21. CPU 101 sets control bit 201 and corresponding value field 203. Computing element 109 accepts and internally reads task descriptor 21 and decodes the information in decision box 205, such that computing element 109 either uses value field 203 as an ID number or breakpoint.

If control bit 201 is set to "debug" then value field 203 includes (step 209) the breakpoint state number; conversely, if the control bit is set to "ID" then the value field includes (step 207) the ID value of the task. Computing element 109, upon reading control bit 201, then uses the value field accordingly.

Figure 5:
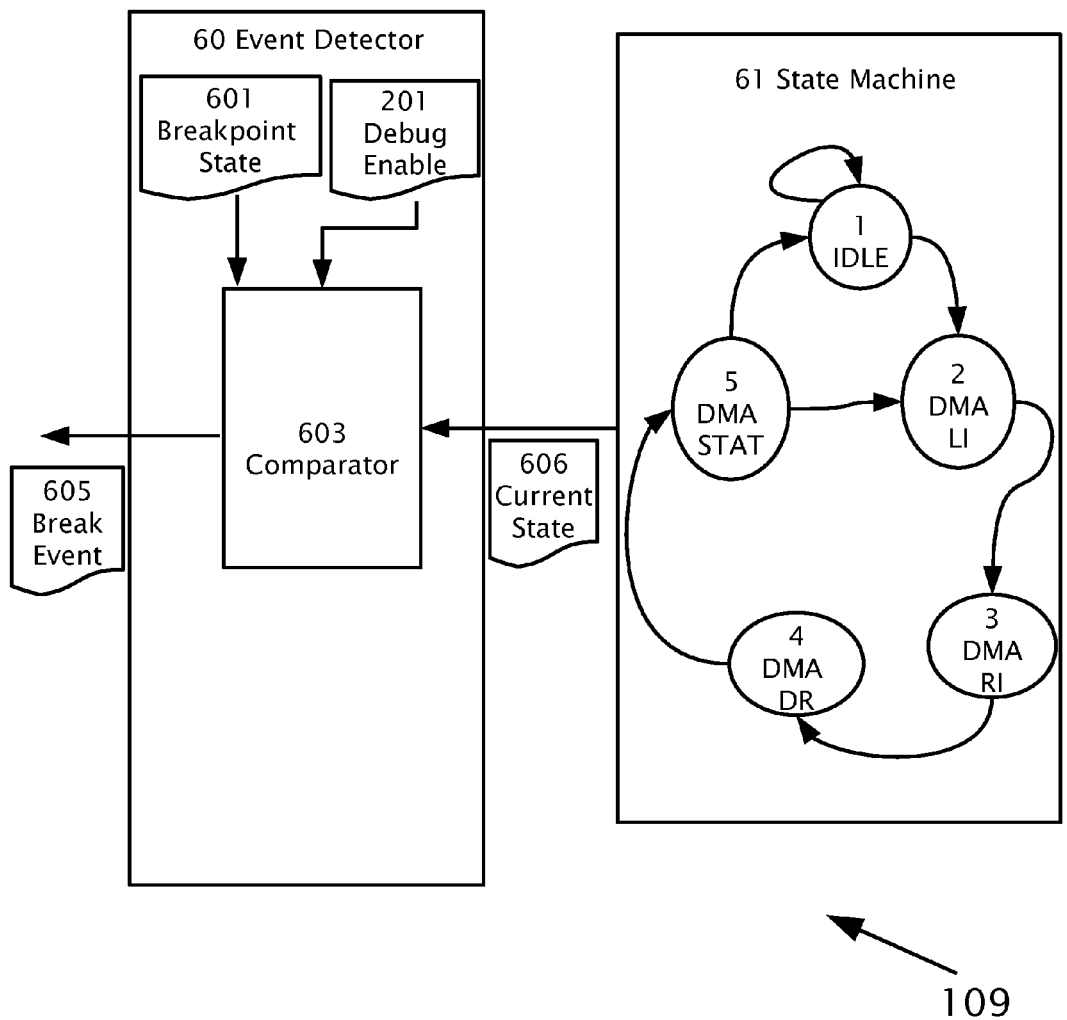
FIG. 5 is a schematic system drawing showing a portion of computing element and operation thereof, according to a feature of the present invention.

Reference is now made to FIG. 5, a schematic system drawing showing a portion of computing element 109 and operation thereof, according to a feature of the present invention. A state machine 61 is shown for computing element 109 which performs a stereo image processing function, by way of example. States of computing element 109 vary between an idle state 1, a state 2 in which direct memory access (DMA) is being performed from an image from a first camera (LI=left image), a state 3 in which direct memory access (DMA) is being performed from an image from a second camera (RI=right image), a state 4 in which disparity results (DR) between the two images are being written and a state 5 in which disparity status is being written. Computing element 109 further includes an event detector 60 which receives in real time the current state 606 indicating one of states 1-5. Comparator 603 compares current state 606 to a breakpoint state 601 which is previously specified in value field 203 when debug ID bit 201 is set to "debug". When current state 606 positively compares to the breakpoint state programmed in register 601, a break event 605 is output.

Figure 3:
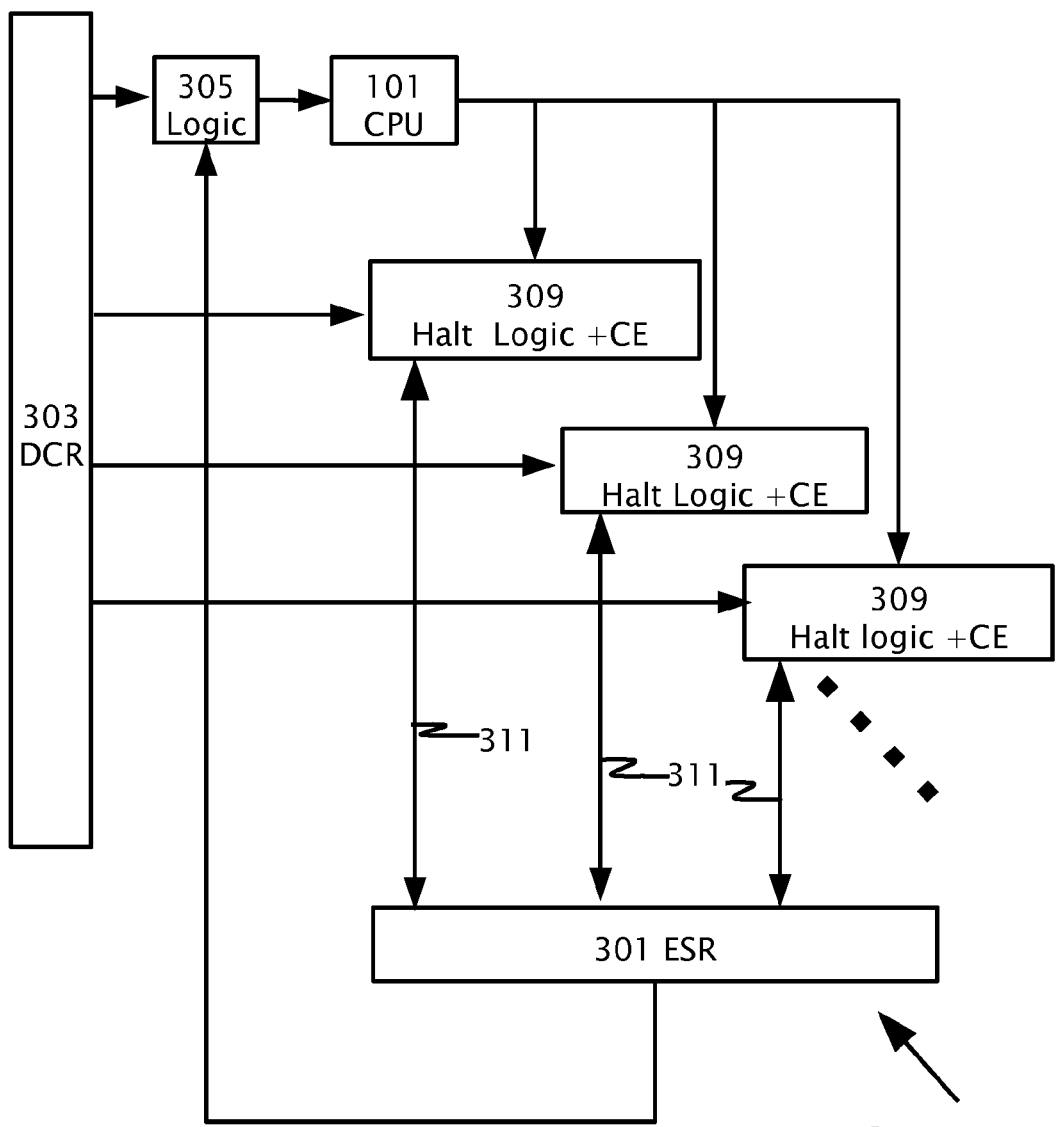
FIGS. 3 and 3A illustrate a simplified system on chip (SoC) with circuitry that implements task interruption and enables debugging, according to an embodiment of the present invention.
Figure 3A:
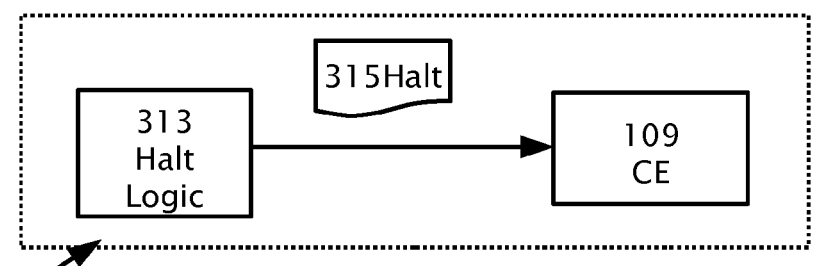

Reference is now made to FIGS. 3 and 3A which illustrate a simplified system on chip (SoC) with circuitry 30 that implements task interruption and enables debugging, according to an embodiment of the present invention. Referring first to FIG. 3A, computing elements 109 are connected to respective halt logic blocks 313. Halt logic block 313 is configured to output a halt signal 315 to Computing element (CE) 109. Computing element 109 and its halt logic block 313 are denoted as a single computing element/halt logic block 309. Referring now also to FIG. 3, each of computing element/halt logic blocks 309 are connected to an event status register (ESR) 301 via hardwired status lines 311. A debug control register (DCR) 303 is connected to and accessible by CPU 101 through its input control logic 305 and drives halt logic/computing element blocks 309 via hardwired control signals.

Figure 4:
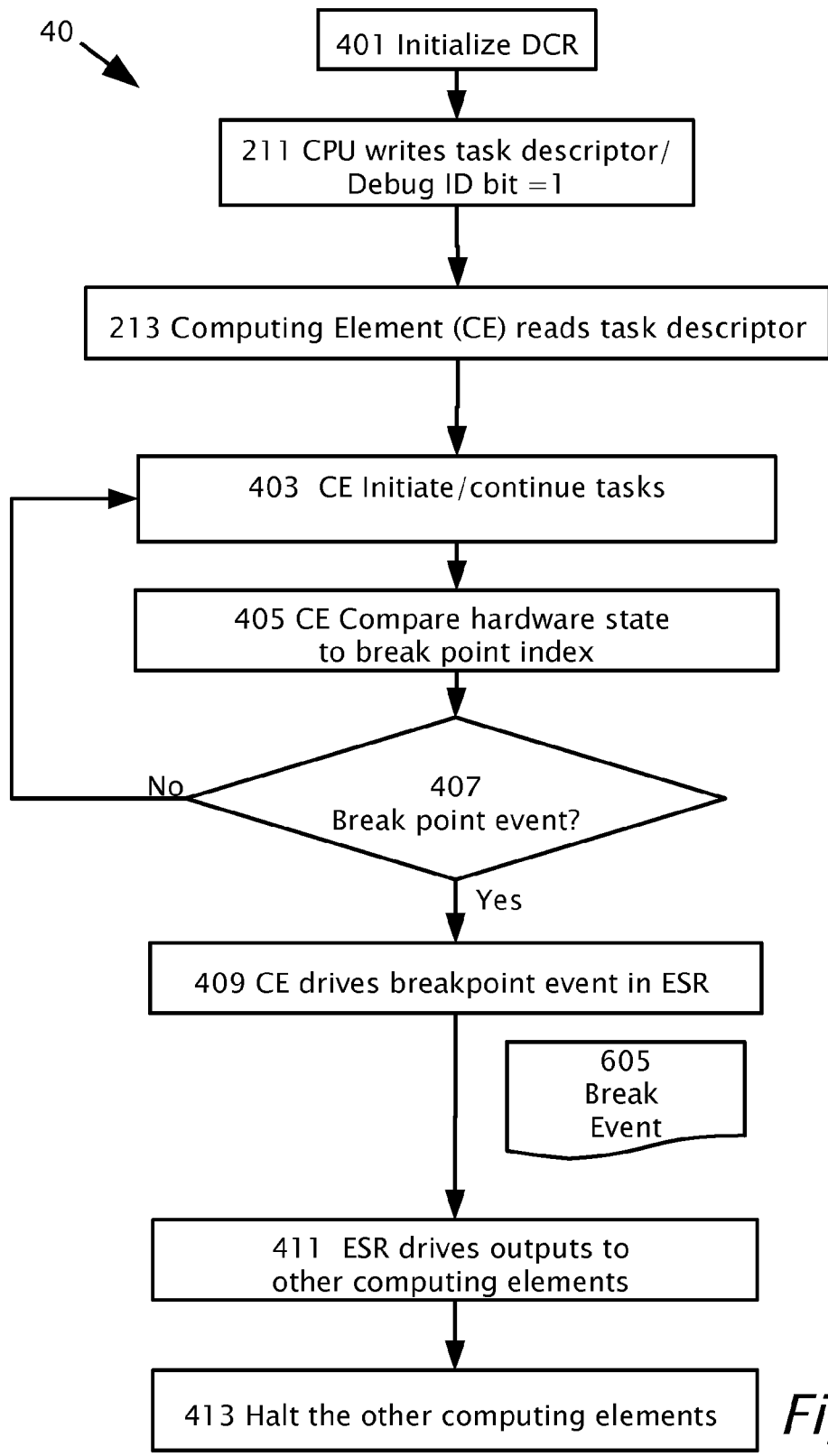
FIG. 4 is a flow drawing which illustrates the operation of circuitry, according to an embodiment of the present invention.

Reference is now also made to FIG. 4 which is a flow drawing 40 which illustrates the operation of circuitry 30, according to a feature of the present invention. DCR 303 is initialized (step 401) by CPU 101 with control parameters that control the debugging process. Task descriptor 21 is written (step 211) by the CPU 101 to computing element 109, and computing element 109 reads (step 213) task descriptor 21. In step 403, computing element 109 initiates performing the task as specified in the task descriptor. In step 405, the current hardware state 606 of computing element 109 is compared to the breakpoint state 601 as specified by breakpoint index 203. If the current hardware state compares positively with breakpoint state 601 then a breakpoint event 605 occurs (decision box 407). Otherwise, computing element 109 continues to process (step 403) its tasks. If computing element 109 never reaches the programmed breakpoint state 601 then computing element in step 403 completes its tasks without ever breaking. When a breakpoint event occurs in decision box 407, a signal is generated (step 409) to event status register ESR 301 and breakpoint event 605 is registered (i.e. stored in ESR 301)

Event status register (ESR) 301 is accessible by halt logic 313 and CPU logic 305. Break events 605 as stored in ESR 301 drive outputs (step 411) to halt logic blocks 313 and to CPU 101 through logic block 305. Halting of operation of CE 109 is performed by halt logic blocks 313 which preferably receive the control (event masking) parameters stored in DCR 303, and in conjunction with break event 605 sent over status lines 311, generates halt signal 315 to halt (step 413) one or all of computing elements CE 109.

Debug Control Register (DCR) 303

DCR 303 is a read/write register that controls the on-chip debug functions by enabling/disabling system generated breakpoints. In the example below, DCR 303 is a 32 bit register.

In addition to the breakpoint halting mechanism described above, the system may also support a halting mechanism of computing elements 109 by CPU 101. CPU 101 preferably selects between a "soft" and "hard" halt of computing element 109 via a soft_hardn bit which controls the CPU halt request type of the computing elements 109. Computing elements 109 may be configured to execute a "soft" halt or a "hard" halt upon receiving an asserted halt at inputs from lines going from ESR 301.

Soft Halt: soft_hardn=1

A halt request is to be executed as a "Soft Halt" such that activity of computing element 109 halts at the completion of the current task. Computing element 109 optionally drives an acknowledgment to ESR 301 that the current task is completed and computing element 109 is in the halted state.

If a CE 109 is configured to "Soft Halt" mode (via the soft_hardn input signal), computing element 109 preferably halts all internal activity at the completion of the current task when the halt input signal 315 is received. This mode thus allows CPU 101 to debug computing element 109 on task completion and thus restart computing element 109 following debug operations. This feature is advantageous since computing element 109 is typically tasked with a list of tasks that are performed sequentially without intervention from CPU 101 until the entire task list has been completed. As such, without the task halt feature, computing element (CE) 109 continues executing tasks until its entire task queue is complete.

To support the CPU halt mechanism there are preferably two signals used: Halt Request and Halt Acknowledge. Halt Request is asserted by CPU 101 indicating to computing element 109 to stop processing at the end of the current task (i.e., in Soft Halt). The Halt Request signal is conditioned by a mask enable bit within DCR 303. The mask and the Halt signals are used by Halt Logic block 313 to generate halt signal 315 that drives CE 109 circuitry. Upon task completion, CE 109 asserts Halt Acknowledge to ESR 301. The halt acknowledge status is then readable by CPU 101. The Halt Request signal from CPU 101 remains asserted to maintain CE 109 in the Halt state. When CPU 101 reads the halt acknowledge in the ESR, it then negates the Halt Request, and as a result, CE 109 negates its Halt Acknowledge and starts processing the next task.

Hard Halt soft_hardn=0:

A Halt request from CPU 101 is to be executed as hard halt such that CE 109 activity is stopped immediately.

If computing element 109 is configured to "Hard Halt" mode, computing element 109 is halted immediately when the halt input signal is received. Typically, after a "hard" halt, computing element 109 cannot reliably be released from the "hard" halt with the expectation that CE 109 can continue running the current task. On hard halt, readable memory elements (i.e., internal memories, registers and state machines) of CE 109 are kept in their halted state and may be read by CPU 101. After debug analysis of CE 109 by CPU 101, CPU 101 typically resets and reprograms CE 109 before exiting the halt state.

As opposed to the soft halt mechanism, only the one Halt Request signal is used to affect the halt mechanism. The Halt Request is asserted by CPU 101 indicating to computing element 109 to stop processing immediately. The Halt Request signal remains asserted to maintain CE 109 in the Halt state. When CPU 101 negates the Halt Request, CE 109 starts processing the newly programmed task.

In both states of soft_hardn, after computing element 109 is halted, CPU 101 proceeds to debug computing element 109.

On SoC reset, soft_hardn=1.

Debug Enable (De):
de=1: Debug is enabled
de=0: Debug is disabled
On SoC reset, de=0.

CE 109 breakpoint halt self enable: (bphse)
bphse=0: disable CE 109 breakpoint self halt.
bphse=1: enable CE 109 breakpoint self halt.
On SoC reset, bphse=1.

CE 109 Breakpoint Halt all Enable: (Bphae)
bphae=0: disable global halt (i.e., one CE 109 breakpoint does not halt all computing elements 109 at once).
bphae=1: enable global halt (i.e., one CE 109 breakpoint causes a halt to be broadcast to all computing elements 109 at once).
On SoC reset, bphae=1.

Control bits bphse and bphae preferably operate independently such that all combinations are valid as follows:

| bphse | bphae | |
|---|---|---|
| 0 | 0 | Breakpoint is not enabled to halt itself nor any other computing element 109 |
| 0 | 1 | Any breakpoint is enabled to cause a halt of all computing elements 109 but not itself |

-continued

| bphse | bphae | |
|---|---|---|
| 1 | 0 | Each computing element 109 breakpoint is enabled to affect itself and only itself |
| 1 | 1 | Any computing element 109 breakpoint is enabled to cause a halt of all computing elements 109 |

Enable Halt Request (haltRQ) to Computing Elements 109:
For eight computing elements 109, hrqe(7:0) are preferably reserved to enable halt requests
hrqe(7:0)–enable haltRQ to CE(7:0) 109
hrqe(n)=0: disable haltRQ to computing element 109n
hrqe(n)=1: enable haltRQ to computing element 109n
hrqe(n) is set to allow a halt request haltRQ to the particular computing element 109 and is typically implemented by a control line (7:0) to computing elements 109.
On SoC reset, hrqe(n)=1.
Software Halt: swhalt:
swhalt=0: clear swhalt
swhalt=1: set swhalt
When set:
CPU 101 enters debug mode if swh2 cpu_en=1.
Computing elements 109 enter halt mode if swh2 ce_en=1, provided that the haltRQ bit and the de bit (debug enable) are also asserted.
On SoC reset, swhalt=0.
swhalt to CPU Enable: swh2 cpu_en:
swh2 cpu_en=0: disable swhalt to CPU 101
swh2 cpu_en=1: enable swhalt to CPU 101
When set: CPU 101 enters debug mode on swhalt.
On SoC reset, swh2 cpu_en=1.
CE Breakpoint Halt to CPU Enable: bph2 cpu_en:
bph2 cpu_en=0: disable breakpoint event from computing elements 109 to CPU 101
bph2 cpu_en=1: enable breakpoint event from computing elements 109 to CPU 101
When set: CPU 101 enters debug mode on any breakpoint halt.
On SoC reset, bph2 cpu_en=1.
Halt from CPU to CEs Enable: cpuh2 ce_en:
cpuh2 ce_en=0: disable CPU halt to CEs
cpuh2 ce_en=1: enable CPU halt to CEs
When set: computing elements 109 enter halt mode when CPU 101 issues halt, provided that the haltRQen bit and the debug enable (de) bit are also asserted.
On SoC reset, cpuh2 ce_en=1.
swhalt to CEs Enable: swh2 ce_en:
swh2 ce_en:=0: disable swhalt to computing elements 109
swh2 ce_en=1: enable swhalt to computing elements 109
When set: computing elements 109 enter halt mode on swhalt, provided that the haltRQen bit and the debug enable (de bit) are also asserted.
On SoC reset, swh2 ce_e=1.

Event Status Register (ESR) 301

Event Status Register (ESR) 301 is typically configured to be partially read-only. ESR 301 is set by breakpoint event 605 and is further updated by halt acknowledgments of computing elements 109. Optionally, a programmer may access Event Status Register (ESR) 301 to determine which CE 109 has triggered break event 605 and which computing elements 109 have halted as a result of break event 605.
hack_ce(7:0): One Bit for Each of Eight Computing Elements 109

These bits are typically read only:
hack_ce(n)=1: computing element 109n is halted.
hack_ce(n)=0: computing element 109n is not halted.
CPU 101 uses bits hack_ce(7:0) to determine when to begin debug (step 59) of computing element 109 by reading contents of event status register 301.
On SoC reset, hack_ce(7:0)=0.
bpevent_ce(7:0) One Bit for Each of Eight Computing Elements 109
bpevent_ce(n)=1: bpevent_ce(n) is set by the breakpoint event signal from the computing elements 109 indicating to CPU 101 that CE 109 has reached the pre-designated breakpoint.
bpevent_ce(n)=0: Events are optionally cleared by CPU 101 by writing '1' to the bpevent_ce(n) bit.
On SoC reset, bpevent_ce(n)=0.

Figure 6:
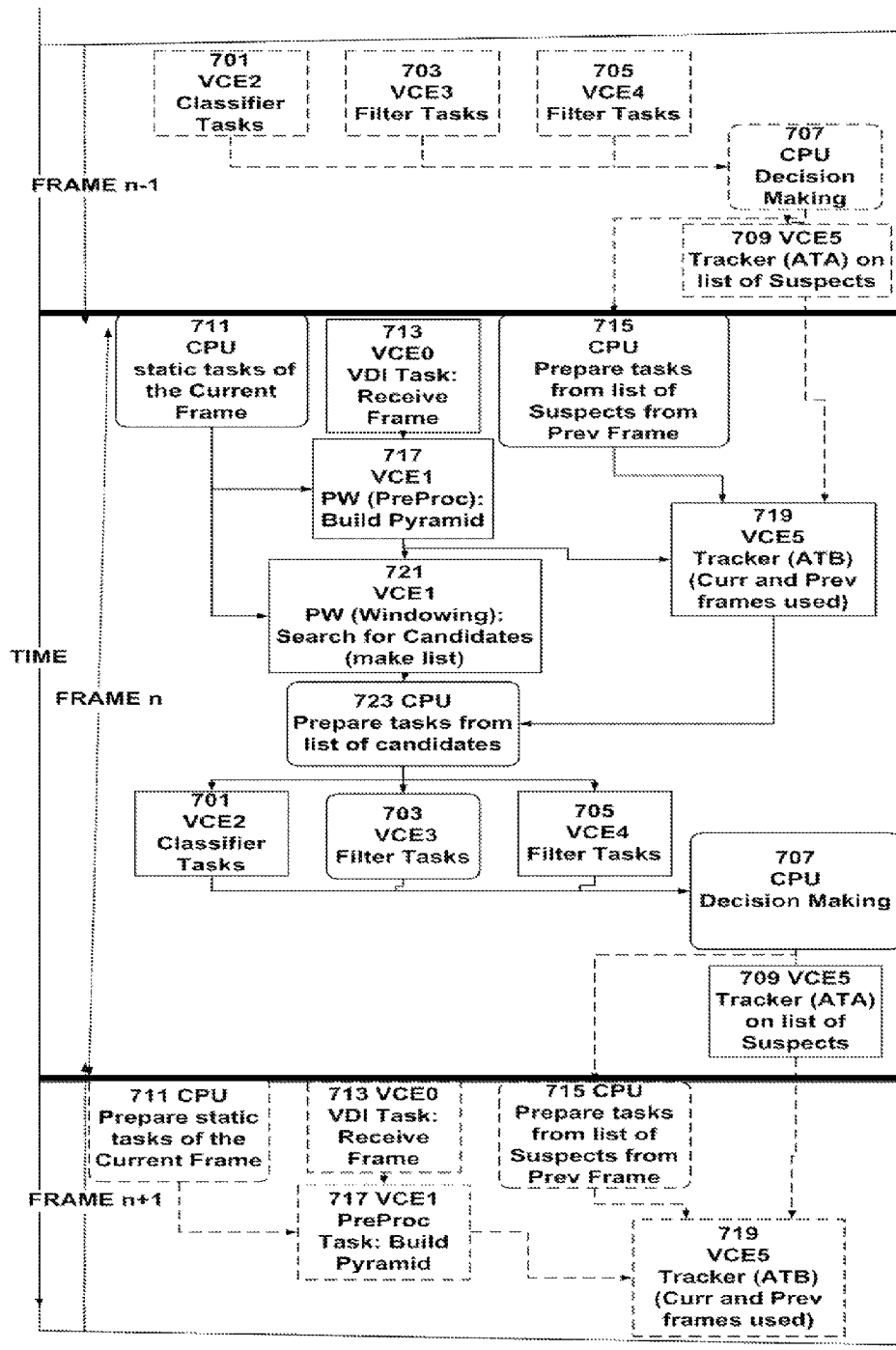
FIG. 6 is a flow diagram of parallel computations being performed over multiple frames in a vision processing application, illustrating an aspect of the present invention.

Reference is now made to FIG. 6, which illustrates a flow diagram 70 of parallel computations being performed over multiple frames in a vision processing application. Multiple image frames are captured by one or two cameras. Control flow is shown from top to bottom where time is divided into three primary blocks indicating processing of frame (n−1), frame n, and frame (n+1). The complete flow for one frame is shown in frame (n), the previous and subsequent frames are included in part due to the dependencies between the frames. Computing elements 109 are labeled VCE which denotes vision computing elements 109. After an image frame is received processing units (i.e., CPU 101, vision computing elements 109) are activated, some in parallel and some in sequence.

Referring now to frame n, CPU 101 configures tasks for VCE1 by writing (step 711) task descriptors to computing elements VCE0 and VCE1.

VCE0 is tasked (step 713) with receiving the current image frame. Upon the first frame being received (step 713), VCE1 performs a build "pyramid" task (step 717) in which the image data of the current image frame is prepared in various image resolutions for further processing. After task 717 is performed, VCE1 then performs task 721 of making a list of objects of interest within the image frame. The list is passed to CPU 101 which then builds tasks (step 723) and task queues based on the list of candidates.

Following step 723, VCE2, VCE3, VCE4 all begin processing in parallel. In step 701, VCE2 performs classifier tasks, and classifies objects of interest within the image frame, in step 703 VCE3 applies a spatial filter to the objects and in step 705, VCE4 applies a different spatial filter to the objects. The results of the processing in steps 701, 703, 705 are output to CPU 707 which integrates the data in a decision making step 707 and passes a list of suspicious objects to VCE5 in order to initialize tracking (step 709).

In parallel to the above processing, CPU 101 (step 715) prepares tasks based on objects received from the previous image frame(n−1). In step 719 VCE5 processes previous and current frames together as VCE5 performs tracking of objects by comparisons between images of different frames over time.

The list of objects being tracked is passed from VCE5 to CPU 101 or a preferably a second CPU 101 for preparing tasks for the next frame (n+1), for instance in step 717.

Given this flow, it can be seen how CPU(s) 101, at various times, can set up task queues in advance for multiple computing elements 109.

Breakpoint Example in SoC Application
Still referring to FIG. 6, an example follows of a method for programming and executing breakpoints in a system on chip, according to an embodiment of the present invention. If, for example there is a problem with the outputs from VCE2 and VCE4 in steps 701,705 which are both outputting data to CPU 101 for decision making (step 707), it may be desirable to stop both VCE2 109 and/or VCE4 109 when either has reached a certain stage in its processing in order to then determine which VCE 109 has reached erroneous results for the current process. CPU 101 programs respectively VCE2 109 and VCE4 109 with breakpoint states 601 of interest. CPU 101 then programs halt logic blocks 313 to stop all VCEs 109 upon receiving a breakpoint from any VCE 109. Once one of VCEs 109 reaches the pre-programmed breakpoint state 601, all VCEs 109 are stopped. ESR 301 indicates which VCE 109 is responsible for the break and CPU 101 can then investigate the internal status of VCE2 109 and VCE4 109 (as well as any other VCEs 109 in the system).

While the invention has been described with respect to a limited number of embodiments, it will be appreciated that many variations, modifications and other applications of the invention may be made.

We claim:

1. A system-on-chip (SoC) with debugging capability, the system-on-chip comprising:
   a central processing unit (CPU);
   a plurality of computing elements operatively connected to said CPU, wherein said computing elements include a hardware state machine which varies among a plurality of states, wherein the CPU is configured to program said computing elements with task descriptors and said computing elements are configured to receive said task descriptors to perform a computation, wherein the task descriptors include a field which specifies a breakpoint state of the computing element; and
   a system level event status register (ESR) operatively attached to and accessible by said CPU and said computing elements;
   wherein each of said computing elements has a comparator configured to compare the present state of the computing element to the breakpoint state, wherein the computing element is configured to drive a breakpoint event to said event status register (ESR) if the present state of the computing element is the breakpoint state;
   wherein each of said computing elements has a halt logic unit operatively attached thereto, wherein said halt logic unit is configured to halt operation of the computing element, wherein said ESR is configurable to drive a breakpoint event to said halt logic units so that at least one of the computing elements is halted other than the computing element driving said breakpoint event.

2. The system-on-chip (SoC), according to claim 1, further comprising:
   a debug control register (DCR) operatively attached to and accessible by the CPU and the computing elements;
   wherein said DCR provides control inputs to said halt logic units.

3. The system-on-chip (SoC) according to claim 2 wherein said control inputs of said DCR are configurable so that when a single computing element drives said breakpoint event, based on said control inputs from said DCR, all the computing elements are halted except said single computing element.

4. The system-on-chip (SoC) according to claim 2 wherein said control inputs of said DCR are configurable so that when a single computing element drives said breakpoint event, and based on said control inputs from said DCR, all the computing elements are halted.

5. The system-on-chip (SoC) according to claim 2 wherein said control inputs of said DCR are configurable so that when a single computing element drives said breakpoint event, and based on said control inputs from said DCR, some but not all of the computing elements are halted.

6. A method for debugging a system on a chip (SoC), the SoC including a central processing unit (CPU), a plurality of computing elements operatively connected to said CPU, a system level event status register (ESR) operatively attached to and accessible by the CPU and the computing elements, the method comprising:
   reading task descriptors by the computing elements received from the CPU;
   initiating a computation by the computing elements as specified in the task descriptors, wherein said computing elements include a hardware state machine which varies among a plurality of states, wherein the task descriptors include a field which specifies a breakpoint state of the computing elements;
   comparing the present state of the computing elements to the breakpoint state;
   upon the present state of the computing elements being the breakpoint state, driving a breakpoint event by the computing element to the event status register (ESR), thereby storing the break point event in the event status register (ESR);
   driving outputs from the ESR to the computing elements; and
   halting operation of at least one of the computing elements other than the computing element driving said breakpoint event.

7. The method, according to claim 6, further comprising:
   configuring a debug control register (DCR) operatively attached to and accessible by the CPU and the computing elements; and
   performing said halting based on the configuration of said DCR.

8. The method, according to claim 6, wherein said halting is for any of the computing elements selectably either: at the end of one of the computations or during one of the computations.

9. The method, according to claim 6, further comprising:
   upon said halting, debugging at least one of the computing elements by the CPU.

10. The method, according to claim 6, further comprising:
    accessing the ESR to determine which of the computing elements triggered said break event.

11. The method, according to claim 6, wherein a system level event status register (ESR) is operatively attached to and accessible by the CPU and the computing elements, the method further comprising:
    accessing the ESR to determine which computing elements are halted as a result of break event.

12. The method, according to claim 6, prior to said halting, the method further comprising:
    configuring said halting based on control inputs.

13. The method, according to claim 12, wherein said driving said breakpoint event is from a single computing element, the method further comprising:
    based on said control inputs, halting all the computing elements except the computing element driving said breakpoint event.

14. The method, according to claim 12, wherein said driving said breakpoint event is from a single computing element, the method further comprising:
    based on said control inputs, halting all the computing elements.

15. The method, according to claim 12, wherein said driving said breakpoint event is from a single computing element, the method further comprising:

based on said control inputs, some but not all of the computing elements are halted.

16. The method, according to claim 6, wherein said halting operation of said at least one of the computing elements is performed immediately upon receiving a halt signal during the computation.

\* \* \* \* \*